United States Patent
Lopez

(10) Patent No.: US 8,041,592 B2
(45) Date of Patent: Oct. 18, 2011

(54) COLLECTION AND ANALYSIS OF MULTIPLE DATA SOURCES

(75) Inventor: Rolando R. Lopez, Lewisville, TX (US)

(73) Assignee: Bank of America Corporation, Charlotte, NC (US)

( * ) Notice: Subject to any disclaimer, the term of this patent is extended or adjusted under 35 U.S.C. 154(b) by 742 days.

(21) Appl. No.: 11/948,146

(22) Filed: Nov. 30, 2007

(65) Prior Publication Data

US 2009/0144102 A1 Jun. 4, 2009

(51) Int. Cl.
*G06F 17/50* (2006.01)
*G06F 9/44* (2006.01)
(52) U.S. Cl. .......... 705/7.11; 705/50; 709/229; 235/382
(58) Field of Classification Search .................. None
See application file for complete search history.

(56) References Cited

U.S. PATENT DOCUMENTS

| | | | | |
|---|---|---|---|---|
| 2005/0281276 A1* | 12/2005 | West et al. | ...................... | 370/411 |
| 2006/0283938 A1* | 12/2006 | Kumar et al. | ................... | 235/382 |
| 2007/0139231 A1* | 6/2007 | Wallia et al. | ..................... | 341/50 |
| 2008/0195579 A1* | 8/2008 | Kennis et al. | ..................... | 707/3 |

* cited by examiner

*Primary Examiner* — Luna Champagne
(74) *Attorney, Agent, or Firm* — Banner & Witcoff, Ltd.; Michael A. Springs

(57) ABSTRACT

Communication data for an organization, such as call, email, and instant messaging activity data from different data sources is collected and analyzed together using a correlation and behavior analysis tool. A set of communication activity records and/or specific contact data information may be provided by the organization's data sources or by an external law enforcement entity. The organization data may be analyzed according to rules and policies of data analysis and correlation using the multiple data sources to identify and report related communication activity or contact data to the internal personnel or external law enforcement for continued investigation in tracking fraud rings and other illegal activities.

17 Claims, 6 Drawing Sheets

COMMUNICATION EVENTS WITH PRIORITY FOR ALL EMPLOYEES – 06/28 to 07/5

| DB_ID | EMPLOYEE | DATA FEED IDs | EVENT TYPE | PRI LEVEL | EVENT TIME | EVENT DURATION | PREV OCCUR. | RELATED CONTACT DATA |
|---|---|---|---|---|---|---|---|---|
| →013 | LAST NAME, FIRST NAME (ID#XXXX) | 100; 200; 500 | 13 | 2 | 07:11:45 06/0... | 110 sec. | 9 | LAST NAME, FIRST NAME (Emp); xXXXX (int); FIRSTNAME.LASTNAME@email.com |
| →014 | LAST NAME, FIRST NAME (ID#XXXX) | 100 | 4 | 4 | 17:08:51 07/0... | 7 sec. | 22 | (XXX)-XXX-XXXX (ext); |
| →015 | LAST NAME, FIRST NAME (ID#XXXX) | 500 | 16 | 2 | 09:26:24 07/0... | N/A | 31 | LAST NAME, FIRST NAME (emp); LAST NAME, FIRST NAME (emp); LAST NAME, FIRST NAME (emp); LAST NAME, FIRST NAME (emp); |
| →016 | LAST NAME, FIRST NAME (ID#XXXX) | 100 | 5 | 1 | 12:15:22 07/0... | 133 sec. | 0 | 011-XXX-XXX-XXXX (ext); |
| ... | ... | ... | ... | ... | ... | ... | ... | ... |

COMMUNICATION SUMMARY FOR FIRST NAME LAST NAME – 05/01 to 05/31

| TYPE | CONTACT DATA | OCCUR. | AVE. DUR. |
|---|---|---|---|
| MOST CALLED (INT) | xXXXX | 41 | 2:11 |
| MOST RECEIVED (INT) | xXXXX | 16 | 0:45 |
| MOST CALLED (EXT) | (XXX) XXX-XXXX | 8 | 0:31 |
| MOST RECEIVED (EXT) | (XXX) XXX-XXXX | 14 | 25:02 |
| MOST CALLED (INTL) | XXX-XXX-XXX-XXXX | 5 | 4:51 |
| MOST RECEIVED (INTL) | XXX-XXX-XXX-XXXX | 2 | 18:23 |
| ... | | | |
| MOST EMAILED (INT) | FIRSTNAME.LASTNAME@bank.com | 73 | n/a |
| ... | | | |
| MOST IM (INT) | FIRSTNAME_LASTNAME | 26 | n/a |
| ... | | | |
| KEYWORD ('TAKEOVER') | FIRSTNAME.LASTNAME@bank.com | 7 | n/a |
| KEYWORD ('BYPASS') | xXXXX | 41 | n/a |
| KEYWORD ('FIRSTNAME') | FIRSTNAME.LASTNAME@bank.com | 5 | n/a |
| ... | ... | ... | ... |
| TREND_1 | FIRSTNAME.LASTNAME@bank.com | 7 | n/a |
| TREND_2 | xXXXX | 5 | 2:11 |
| ... | | | |
| PATTERN_1 | n/a | 3 | n/a |
| PATTERN_2 | n/a | 1 | n/a |
| ... | | | |

- 610: MOST CALLED/RECEIVED rows
- 620: MOST EMAILED (INT)
- 630: MOST IM (INT)
- 640: KEYWORD rows
- 650: TREND rows
- 660: PATTERN rows

FIG. 6

COLLECTION AND ANALYSIS OF MULTIPLE DATA SOURCES

FIELD OF THE TECHNOLOGY

Aspects of the disclosure generally relate to detection and investigation of fraud and other illegal activities using the collection of analysis of communication data from multiple data sources.

BACKGROUND

Financial institutions such as banks and a growing number of other businesses in today's fast-paced economy manage assets and funds for customers, and provide secure services and transactions to allow customers to quickly transfer or withdrawal their assets, and to retrieve and update confidential account information online, over the phone, via email, or using other remote communications supported by the business. However, the vast numbers of accounts, customers, and assets stored by financial institutions, along with the new technical features for quickly and remotely accessing account assets, data, and other confidential information have led to a robust banking fraud community. Financial institutions lose millions of dollars each year to fraud, and sophisticated criminals have become experts at fraudulently acquiring sensitive information, such as social security numbers, bank account numbers and PINs, credit card numbers, and online login credentials (i.e., usernames and passwords) for secure business applications. In fact, employees of financial institutions and other business are often recruited to assist with perpetrating a fraud or other illegal activities against the business by compromising the assets and confidential data of the customers or the business itself. Unfortunately, most security systems focus on the detection and prevention of unauthorized external access attempts against the customers' accounts, or external attempts to acquire other secure and confidential information from the business. Thus, fraud activities conducted internally or assisted by employees may elude detection by an internal or external investigation group for long periods of time, and may allow internal fraud rings to go undetected long enough to cause considerable damage to compromised accounts and to acquire many pieces of confidential information.

Previous attempts to investigate fraud and other illegal activities within an organization have included implementing an infrastructure within the organization for monitoring and reviewing internal-to-internal and internal-to-external communications, such as telephone dialed digit data and email transmission data. However, this data is typically only available as a dialed digit or email report at the end of predetermined time period, for example, every 30 or 60 days. Thus, the format and timing of current reports may frustrate efforts to conduct thorough and timely investigations. For example, if a bank employee is suspected of participating in a fraud ring, the bank might need to wait weeks or months before reviewing the employee's work phone records. Then, if a second employee is identified as another potential fraud ring member, the bank investigation personnel must endure another lengthy wait to retrieve the phone records of the second employee.

Additionally, in previous attempts to create a fraud investigation infrastructure within an organization, there was no way to perform an automatic data analysis for correlation rules, trends, and patterns including multiple data sources. For example, either phone data or email data could be analyzed, but they could not be analyzed together to search for patterns or communication sequences involving multiple types of communications. In view of these limitations, the role of this internal communication data in a fraud investigation conducted by an organization is often restricted to after-the-fact corroborative evidence that is often used only after the fraud ring has been identified and acted against. Accordingly, there remains a need for systems and methods for collection and analysis of multiple data sources of communication data for investigation of fraud and other illegal activities.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

According to one aspect of the present disclosure, communication data from an organization is collected and analyzed in connection with an investigation of fraud or other illegal activities directed against the organization. For example, a financial institution or other business may monitor and collect data from multiple different sources of employee communications, such as telephone call activity data, email activity data, and instant messaging activity data. These multiple data sources, along with other additional data such as internal corporate directory data and employee personnel data may be provided to a correlation tool for data analysis. The correlation tool may execute a set of correlation rules and policies, perform a trend and pattern analysis on the multi-sourced data, and may output reports identifying communication events and contact data that may potentially be connected to a fraud ring or other illegal activities.

According to an additional aspect of the present disclosure, the reports and related communication data produced by the data analysis may assist investigations conducted internally by organization security personnel or by external law enforcement. In addition, these internal and external security and investigation groups may provide further contact data (e.g., suspect names, telephone numbers, email addresses) to the data analysis process for further analysis in the ongoing investigation. According to an additional aspect, a visual analysis and charts of patterns and trends identified in the communication data may be included in the data analysis reports. For example, 2-deep, 3-deep, 4-deep patterns, and so on, of repeating communication sequences occurring close in time may be identified and reported for further investigation and analysis. Other communications and communication sequences may be identified based on the timing, keywords, repetition, and/or duration of the communication, and on the parties involved in the communication.

BRIEF DESCRIPTION OF THE DRAWINGS

Figure 1:
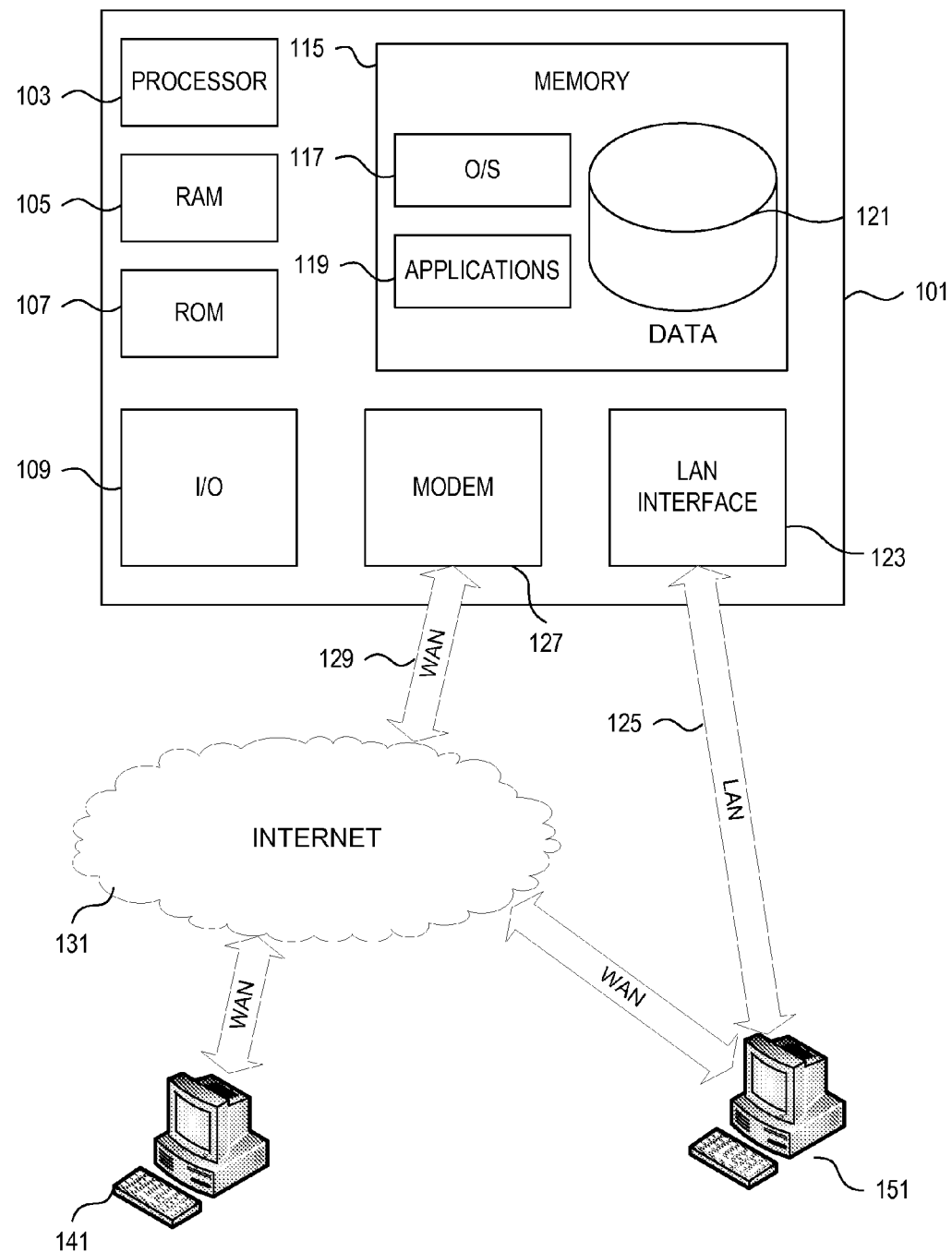
Figure 2:
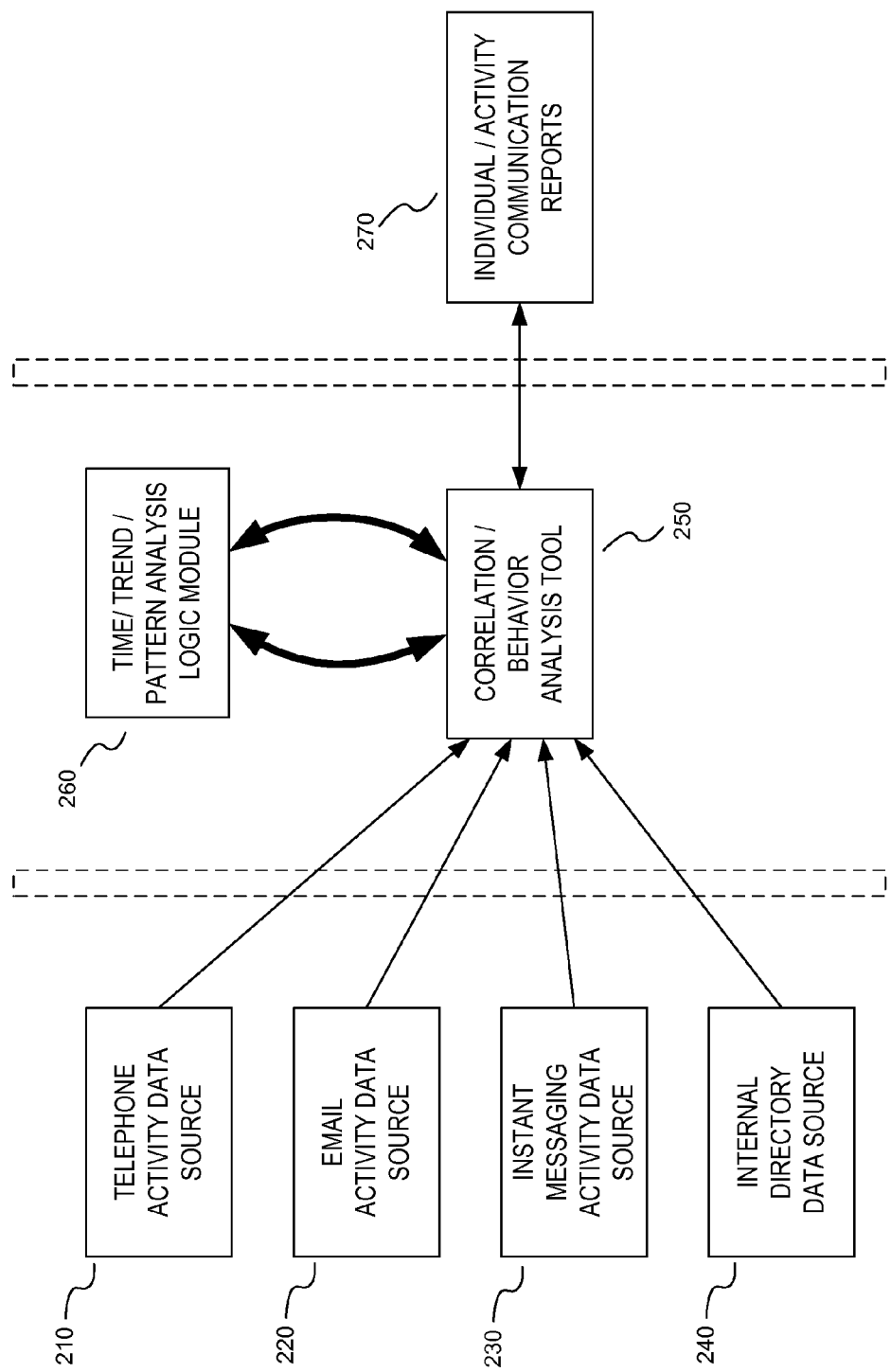
Figure 3:
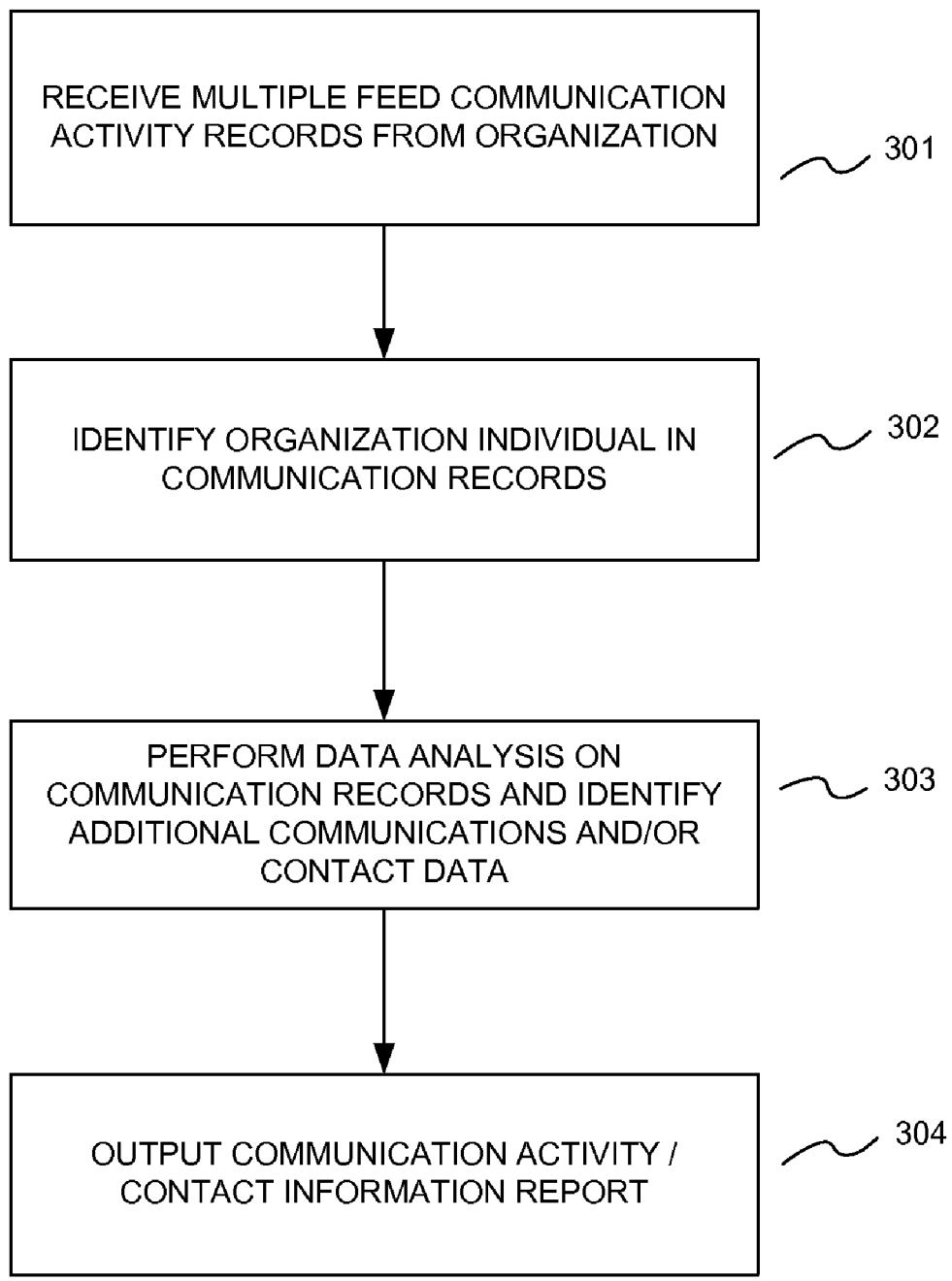
Figure 4:
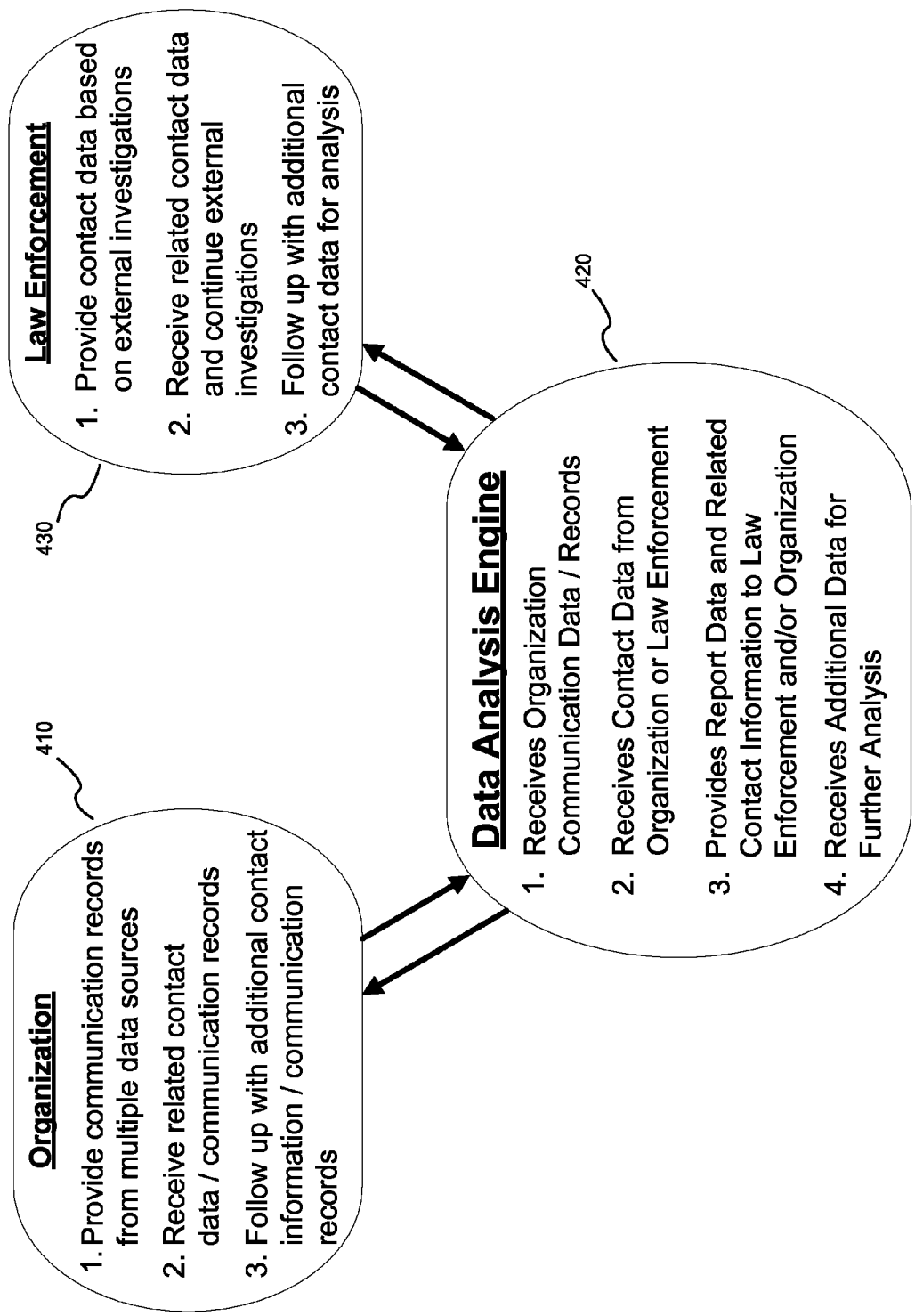

Having thus described the invention in general terms, reference will now be made to the accompanying drawings, which are not necessarily drawn to scale, and wherein:

FIG. 1 is a block diagram illustrating a computing device, in accordance with aspects of the present invention;

FIG. 2 is a block diagram showing illustrative components in a system for collecting and analyzing communication activity data from multiple data sources, in accordance with aspects of the present invention;

FIG. 3 is a flow diagram showing illustrative steps for receiving and analyzing communication activity data, in accordance with aspects of the present invention;

FIG. 4 is a block component diagram showing illustrative interactions between an organization, a data analysis engine, and a law enforcement entity, in accordance with aspects of the present invention;

FIG. 5 is an illustrative reporting table storing information relating to communication events identified from the communication records of an organization, in accordance with aspects of the present invention; and FIG. 6 is an illustrative reporting table storing a communication summary for an employee compiled from communication records of an organization, in accordance with aspects of the present invention.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 illustrates a block diagram of a generic computing device 101 (e.g., a computer server) that may be used according to an illustrative embodiment of the invention. The computer server 101 may have a processor 103 for controlling overall operation of the server and its associated components, including RAM 105, ROM 107, input/output module 109, and memory 115.

I/O 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of account information and account holder information for the entire business, allowing interoperability between different elements of the business residing at different physical locations.

The server 110 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are exemplary and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the server 101 according to an illustrative embodiment of the invention may include computer executable instructions for invoking user functionality related to communication, such as email, short message service (SMS), and voice input and speech recognition applications.

Referring to FIG. 2, an illustrative block diagram is shown including various components 210-270 of a system for collecting and analyzing communication activity data of an organization received from multiple data sources 210-240. As described above, an organization may collect and analyze communication records and activities as part of an internal investigation for fraud of other illegal activities occurring within the organization. For example, many banks and other financial institutions suffer significant losses from fraud and embezzlement caused by illegal activities perpetrated and assisted by employees. Thus, a bank may implement an internal investigation system (in addition to any investigation by external law enforcement) similar to the system in this example by itself or using a third party provider of data collection and/or analysis services.

In this example, communication activity data is collected from four different data sources 210-240 at a correlation and behavior analysis tool 250 that uses a rule and pattern analysis logic module 260 to identify additional contact data and communication activity records in reports 270 that can be used by the organization and/or external law enforcement entities to further investigate any illegal activities occurring within the organization.

Component 210 represents a data source for providing telephone call records and other telephone-related communication data of the organization, such as dialed digit data, calls received numbers, and call duration, etc. As discussed below, an organization such as a financial institution or business may implement its own telephone activity data source 210 for logging call data of all calls initiated by or received by any telephone within the infrastructure of the business (e.g., employee offices, conference rooms, reception areas, call centers, etc.). A business may also coordinate with a third-party provider for implementing a telephone activity data source 210, for example, the EDS Corporation. Additionally, in some infrastructures, the telephone activity data source 210 may comprise multiple different data sources, for example, when telephone calling services within an organization are implemented using multiple different networks. For instance, internal to internal calls, external to internal calls, and internal to external calls might each be monitored and logged by different monitoring tools or tracked by different communication data providers, and thus may involve separate telephone activity data sources 210. Additionally, an organization might provide telephone services using not only a standard land-based telephone network, but also by supporting calls made and received over internal and external computer networks using a voice over internet protocol (VoIP) provider, and telephone calls made over cellular networks, satellite networks, and other available communication networks for supporting calls. For example, an organization supporting both VoIP and land-based telephone calls might rely on two different systems, a Symphony Service Corp. system using a network of private branch exchange (PBX) boxes for monitoring and logging dialed digit data coming into and out of the organization via the land-based telephone network, and an ISI, Inc. system for monitoring and logging similar dialed digit data for incoming and outgoing VoIP calls.

Table 1 contains a list of some of the telephone activity data types that may be provided by the telephone data source 210. It should be noted that Table 1 is an illustrative list only, and other types of telephone activity data may be provided as well. Additionally, the different types of information provided by the telephone data source 210 may depend on the organization infrastructure and/or telephone networks used. For example, a telephone activity data source 210 configured to monitor and report VoIP telephone calls may report both a caller telephone number and caller computer IP address, while a landline telephone data source may report only the caller telephone number and not any corresponding IP address. Additionally, as shown in Table 1, call subscriber information may be provided by the telephone data source 210. A call, email, or IM subscriber may be a person associated with the communication record or account that might not be the person sending or receiving the communication. Call, email, or IM subscribers might be device owners or registered account holders of communications devices or systems. For example, an office phone in an organization might be registered to one employee even though a different employee is able to make calls on the phone.

TABLE 1

| Call Properties | |
| --- | --- |
| Originating phone number | Receiving Login Name/ID |
| Originating IP address/terminal ID | Call time |
| Originating Login Name/ID | Call date |
| Originating Call Authorization Number | Call duration |
| Receiving phone number | Call subscriber |
| Receiving IP address/terminal ID | Conversation text via voice recognition |

Component 220 represents a data source for providing records of outgoing and incoming email activity of the organization. The email activity data source 220 may collect and compile email data, for example, by monitoring the intranet and other computer networks within the organization and identifying network traffic sent via standard electronic mail protocols, or by monitoring and logging email transmissions and deliveries occurring within the organization's email servers. In some implementations, a business may install a third-party network data monitoring product, such as Network Monitor or Network Prevent created and distributed by Vontu Corp., and manage the product locally to perform email tracking and data collection on incoming and outgoing email messages. In other examples, a business may contract out its email data monitoring to a third-party provider that serves as its email source 220.

As discussed in greater detail below, the communication activity data sources 210-240 may provide regular reports and data compilations describing the organization's phone activities, email activities, IM activities, etc. However, for large organizations with many employees and many different lines of communication, it may be difficult to compile and summarize the large amounts of data in an easily usable form. Thus, data sources 210-240 (whether implemented internally or externally) may also provide request-response services wherein the security and investigation teams of the organization can issue a specific request (or query) via correlation tool 250 to a data source 210-240 and quickly receive a response. For example, although the email activity data source 220 may be configured to provide scheduled reports about certain types of email activities, it may also respond to a specific request for email communications and statistics for a individual/employee, during a certain time period, or including certain key words, etc., thus allowing the correlation and pattern analysis tool 250 to cross-link data from multiple data sources for quicker rapid targeted investigations.

Table 2 contains an illustrative list of some of the different types of email activity data that may be collected and provided by the email data source 220. As noted above, different data sources may provide different types of email data, and data source 220 may comprise multiple different data sources that correspond to different messaging servers or different email protocols, or that correspond to internal to external messages, external to internal messages, and internal to internal messages, etc.

TABLE 2

| Email Properties | |
| --- | --- |
| Sender address | Receiver IP address/terminal ID(s) |
| Sender name | Message timestamp |
| Sender domain | Message date |
| Sender subscriber | Message subject |
| Sender IP address/terminal ID | Message length |
| Receiver address(es) | Message content type |
| Receiver name(s) | Message attachments |
| Receiver domain(s) | Message text |
| Receiver subscriber(s) | Message embedded content |

Component 230 represents an instant messaging (IM) data source for providing records of outgoing and incoming IM activity within the organization. The IM data source 230 may provide IM data using similar techniques to those described above for collecting and compiling email data by the email data source 220. For example, an organization may use a third-party network data-monitoring product, such as Vontu's Network Monitor or Network Prevent to log and collect IM data from the organization's IM servers and the IM communication networks. Table 3 contains an illustrative list of some of the different types of IM activity data that may be collected and provided by the email data source 230.

TABLE 3

| Instant Message Properties | |
| --- | --- |
| Sender address and/or user identifier | Receiver subscriber(s) |
| Sender name | Receiver IP address/terminal ID(s) |

TABLE 3-continued

Instant Message Properties

| | |
|---|---|
| Sender service provider | Message timestamp |
| Sender subscriber | Message date |
| Sender IP address/terminal ID | IM conversation length |
| Receiver address(es) | IM conversation duration |
| Receiver name(s) | IM attachments |
| Receiver domain(s) | IM text |

Component 240 represents an internal directory data source for providing data relating to organization members (e.g., employees) and resources that may be cross-linked with the other data sources by the correlation tool 250. For example, data source 240 may correspond to a corporate directory server accessible via the lightweight directory access protocol (LDAP). An LDAP server data source 240 may store organization data such as employee names, internal telephone numbers and extensions, internal email aliases, job titles, office locations, and organization hierarchy information (e.g., product group, direct manger, direct reports, etc.). Thus, for example, a correlation tool 250 configured to receive organization data from the internal directory data source 240 may be able to identify parties to internal communications via telephone, email, IM, etc., and then identify complex communication chains between multiple employees using different communication techniques or networks. Internal directory data from data source 240 may also allow investigators to identify certain internal or external communications as more likely work related (based on job title, group, co-workers, etc.) and thus less likely related to fraudulent or other illegal activities.

Although the internal directory data source 240 provides internal organization data, it may also be implemented by a third-party software product or provided by an external provider. For example, an organization may contract out its internal directory storage service to a LDAP information services vendor. Additionally, in this example, the internal directory data source 240 might include multiple data sources and other types of internal organization or corporate data. For example, a human resources or payroll database of a business may include the employees' home addresses, phone numbers, names of family members, and other data that may allow the correlation tool 250 to potentially identify and characterize different calls, emails, and IM of employees as personal, and thus less likely related to fraudulent or other illegal activities.

In this example, the data analysis is performed on the communication activity data received from the data sources 210-240 at a correlation and behavior analysis tool 250, which uses a logic module 260 to perform time analyses, trend analyses, and pattern analyses on the multi-sourced data. For example, a time pattern analysis might identify a set of telephone calls, emails, and/or IMs that were made at the same time of day (e.g., within a specified time window), on the same day, or within a specific time window on a series of days (e.g., every morning, every evening just after closing, etc.). In this example, a related trend analysis might determine the frequency of the analyzed time patterns. For instance, identifying trends of certain patterns that occur more often at the beginning of week, or occur more often on weekdays, weekends, etc. In certain scenarios, the correlation tool 250 may include Actimize Analytics Server, Case Manager, and Visual Modeler created and distributed by the Actimize Corporation, Overwatch Systems owned and distributed by Textron Corp., and/or other correlation and behavior analysis products. A team of internal investigators and/or external law enforcement personnel may create and store correlation rules (predetermined responses to certain events or occurrences that may be detected by the correlation tool 250) and policies (broader plans of action to guide the correlation and behavior analysis processes) in the logic module 260. The correlation tool 250 may be configured to retrieve and execute the rules and policies implemented by investigators in the logic module 260, and to output reports 270 based on these analyses. Illustrative examples of correlation patterns that may be implemented by rules and policies, relating to telephone activity data, email activity data, IM activity data, and combinations of activity data from multiple data sources 210-240 are listed in Tables 4-7 below, and more specific examples and user scenarios are described in reference to FIGS. 5-6.

TABLE 4

Call Data Correlation Patterns

| | |
|---|---|
| Employee (Individual) name | Telephone number to subscriber (internally) |
| Telephone prefix | International numbers dialed |
| Telephone prefix by date | International numbers received |
| Date stamp on telephone number | Calls by days of month |
| Time stamp on telephone number | Calls by weeks of month |
| Date and time stamp | Calls by month of year |
| Call duration | 10 day report of most dialed (or received) numbers |
| Frequency of number dialed | 10 day report of most dialed (or received) numbers including date and/or time stamp and/or subscriber |
| Frequency of number dialed including data and time stamp (by day of week, day/week of month, month of year, year) | 20/30 day report of most dialed (or received) numbers |
| Frequency of number received | 20/30 day report of most dialed (or received) numbers including date and/or time stamp and/or subscriber |
| Frequency of number received including data and time stamp (by day of week, day/week of month, month of year, year) | Most called (or received) telephone numbers |
| Subscriber information (if available) | Most called (or received) international numbers |
| Telephone number to address on telephone subscriber information | 2 deep pattern of telephone numbers received or dialed externally or internally |
| Telephone number to address on telephone | 3-, 4-, or 5-deep patterns (and so on) of telephone numbers received or dialed externally or internally |
| Telephone number(s) dialed externally | Matching telephone number to subscriber name (internal and external) |
| Telephone number(s) dialed internally | Matching telephone number to any related names in case management system of correlation tool |
| Telephone number to subscriber (externally) | Matching telephone number in database with telephone number searched against it |

TABLE 5

Email Data Correlation Patterns

| | |
|---|---|
| Employee (Individual) name | Emails sent by month(s) of year (specific or non-specific) |
| Email address sent | 10 day report of most emailed addresses (or addresses received from) including date and/or time stamp and/or subscriber |
| Email address received | 20 day report of most emailed addresses (or addresses received from) including date and/or time stamp and/or subscriber |
| Domain of email sent/received | 30 day report of most emailed addresses (or addresses received from) |

TABLE 5-continued

Email Data Correlation Patterns

| | |
|---|---|
| | including date and/or time stamp and/or subscriber |
| Date stamp on email | Most emailed address |
| Time stamp on email | Most emailed address received from |
| Date and time stamp on email | 2 deep pattern of emails received or sent externally or internally |
| Frequency of email address sent to | 3-, 4-, or 5-deep patterns of emails received or sent externally or internally |
| Frequency of email address sent to including data and time stamp (by day of week, day/week of month, month of year, year) | 2 deep pattern of emails sent or received externally or internally by date, day of week, week of month, or month of year |
| Frequency of email address received from | 3-, 4-, or 5-deep patterns of emails sent or received externally or internally by date, day of week, week of month, or month of year |
| Frequency of email address received from including data and time stamp (by day of week, day/week of month, month of year, year) | Match email user name to telephone number subscriber or user name (internal and external) |
| Email subscriber | Matching email user name to any related names in case management system of correlation tool |
| Emails sent externally | Matching email address to user name in organization/corporate directory |
| Emails sent internally | Searching email for key word(s) |
| Emails sent by day(s) of month (specific or non-specific) | Searching email for key string(s) |
| Emails sent by week(s) of month (specific or non-specific) | Matching email key word/string searches against key word/string searches from Instant Messenger data |

TABLE 6

Instant Message Correlation Patterns

| | |
|---|---|
| Employee (Individual) name | 10 day report of most IM sent (or received) location including date and/or time stamp and/or subscriber |
| Date stamp | 20 day report of most IM sent (or received) location including date and/or time stamp and/or subscriber |
| Time stamp | 30 day report of most IM sent (or received) location including date and/or time stamp and/or subscriber |
| Date and time stamp | 2 deep pattern of IMs received or sent externally or internally |
| IM sender address/ user identifier | 3-, 4-, or 5-deep patterns of IMs received or sent externally or internally |
| IM received by address/user identifier | 2 deep pattern of IMs sent or received externally or internally by date, day of week, week of month, or month of year |
| IM sender IP location | 3-, 4-, or 5-deep patterns of IMs sent or received externally or internally by date, day of week, week of month, or month of year |
| IM receiver IP location | Matching IM string of key word(s) to similar strings used in other IM's |
| Service provider of IM sender/receiver | Matching IM name of user to telephone number or subscriber information derived from internal or external subscriber information |
| IM sent by day(s) of month (specific or non-specific) | Matching IM name of user to any related names in case management system of correlation tool |
| IM sent by week(s) of month (specific or non-specific) | Matching IM name of user to address on telephone subscriber information |
| IM sent by month(s) of year (specific or non-specific) | Matching IM user name against organization/corporate directory data |

TABLE 7

Multiple Data Source Correlation Patterns

| | |
|---|---|
| Employee (Individual) name | Frequency pattern by day, date and time, using email activity and IM activity |
| Chronological pattern by day, date and time, using call activity and email activity | Frequency pattern by day, date and time, using call activity, email activity, and IM activity. |
| Chronological pattern by day, date and time, using call activity and IM activity | Visual analysis charts by day, date and time, using call activity and email activity |
| Chronological pattern by day, date and time, using email activity and IM activity | Visual analysis charts by day, date and time, using call activity and IM activity |
| Chronological pattern by day, date and time, using call activity, email activity, and IM activity. | Visual analysis charts by day, date and time, using email activity and IM activity |
| Frequency pattern by day, date and time, using call activity and email activity | Visual analysis charts by day, date and time, using call activity, email activity, and IM activity. |
| Frequency pattern by day, date and time, using call activity and IM activity | |

Referring to FIG. 3, an illustrative flow diagram is shown in which an organization receives and analyzes communication activity data, then outputs related communication data and/or contact data based on the analysis. In this example, the steps 301-304 may be performed by a system such as the data collection and analysis system shown in FIG. 2. For instance, steps 301-304 may be performed by a software process (e.g., data analysis engine 420 of FIG. 4) comprising a correlation and behavior analysis tool 250 and implementing policies and rules designed by investigators and stored in the logic module 260.

In step 301, a data analysis engine 420 receives communication activity data from one or more data sources 210-240. As discussed above in reference to FIG. 2, the data analysis engine 420 may receive call, email, and IM activity data corresponding to communications within the organization. The data analysis engine 420 may also receive internal directory data and other employee/individual data from other organization data sources. For example, data logs from an inter-office physical mail service that tracks letters and packages sent and received by employees to other employees or to outside locations may be used as an additional data source.

In step 302, the data analysis engine 420 identifies a first piece of contact data in the organization from the communication data received in step 301, for example, a name of a first individual in the organization or employee in the business. As an example, the name of an employee of a business that has been identified as part of an internal investigation or by an external law enforcement entity may be used as a starting point in the data analysis performed in step 303. The information identified in step 302 may also include other information instead of (or in addition to) a name, such as one or more telephone numbers, email addresses, IM user identifiers, computer IP addresses or computer names, or internal network user logins, since any of these information types may also be identified as part of an internal or external investigation.

Additionally, the name or other contact data identified in step 302 may be the result of the execution of predetermined rules or policies by the correlation tool 250. For example, a communication or sequence of communications within the organization might be flagged as having a greater potential of being connected to fraud or illegal activities based on the different characteristics of the sequence, such as the time of day, recurrence, or duration of the communication sequence, or other factors. More specific examples of potentially fraudulent or illegal communication sequences are described below in reference to FIG. 5. Thus, step 302 may comprise identifying a participant in a communication or sequence reported by a previous data analysis process that has been identified for further analysis and investigation.

In step 303, data analyses (e.g., time, trend, and/or pattern analyses) are performed by the data analysis engine 420 using the name or other contact data identified in step 302, so that additional communication records or contact data may be identified. Tables 4-7 above contain illustrative examples of data analyses that may be performed by the data analysis engine 420. Specifically, a data analysis in step 303 may include execution of multiple different correlation patterns selected from one or more of Tables 4-7. For example, if an employee name has been identified in step 302, then step 303 might include a 2-deep multi-source data analysis on that employee. That is, each related piece of contact data (e.g., name, phone number, email address, etc.) identified in a communication with the employee (i.e., first level matches), and each additional contact data identified in communication with one of the first level matches (i.e., second level matches), may be compiled and returned as part of a 2-deep analysis. As noted in Tables 4-7, similar 3-deep and 4-deep analyses, and so on, may be performed by the data analysis engine 420 using the multiple data source data.

Additionally, the collection of data identified by execution of the data analysis in step 303 may be refined or pared down based on correlation with other factors or other data sets. As mentioned above, other factors such as call duration, call timing, or the keyword strings or phrases found in the communication records may affect the classification of newly identified communication data as having a greater or lesser likelihood of being connected to fraudulent or illegal activities. Additionally, newly identified contact data (e.g., names, telephone numbers) may be compared to data from other data sources, such as business personnel files or organization hierarchy data to determine that the contact data is more or less likely to be a criminal contact. For example, an employee's repeating pattern of telephone calls to the same number at approximately the same time of day might be less likely to be flagged for further analysis if the call is made to the employee's spouse or children. However, if the phone number called matches a case management list of internal (or external) fraud investigations, or matches a suspicious area code prefix or international country code, then the number might be flagged and returned in a report of contact data for further investigation.

In step 304, the additional communication records and/or contact data identified in the above data analysis are output, for example, in a communication activity report to a security or fraud investigation team within the organization. Examples of output reports are shown in FIGS. 5 and 6 and described below. Output reports and any other related data identified by the data analysis might also be provided to an external law enforcement entity 430 as described below in reference to FIG. 4.

In FIG. 4, a component diagram is shown describing illustrative interactions between an organization 410, a data analysis engine 420, and a law enforcement entity 430. The interactions in the example may correspond to at least some of the steps described in FIG. 3 above. For example, the reporting step 305 may correspond to item 3 in the data analysis engine 420, wherein the related communication data is provided to the organization 410 and/or law enforcement entity 430.

In this example, the organization 410 provides communication records (e.g., via data sources 210-240) to the data analysis engine 420, and then receives the related communications or contact data from the engine 420 following the data analysis. Similarly, the law enforcement entity 430 provides contact data based on external investigations and receives related communications or contact data from the data analysis engine 420 to continue with its investigations based on the received data. Subsequently, the organization 410 and/or law enforcement entity 430 may follow up by providing additional communication activity data or contact data based on their subsequent investigations using the results of the first data analysis. As this example illustrates, an investigation of communication activity from multiple data sources, such as an investigation of a sophisticated fraud organization, may be a complex process requiring multiple interactions between the data providers (e.g., organization 410 and law enforcement 430) and the data analysis engine 420. For instance, a name or other contact data may be used in a first data analysis process that yields other contact names or related communications that the law enforcement entity may investigate further before initiating a second data analysis with new contact data obtained in its external investigation, and so on, in order to identify the different members and communication records of the fraud organization.

The data analysis engine 420 receives communication activity data and contact data from the organization 410, for example, communication records from multiple data sources 210-240, and a list of contact names and email addresses associated with internal security violations or fraud investigations. The data analysis engine 420 in this example also receives contact data from the law enforcement entity 430, for example, a list of contact names, phone numbers, addresses, or keyword phrases associated with ongoing law enforcement investigations. After receiving the initial data, the data analysis engine 420 performs data analyses and then provides reports and related contact data to the organization 410 and/or law enforcement entity 430. As described above, the data analysis engine 420 may receive additional information and perform additional data analyses for ongoing investigations.

Although the organization 410, data analysis engine 420, and law enforcement 430 are shown as different entities in this example, some or all of these functions may be performed together by a single entity. For example, an organization 410, such as a financial institution or other business, may implement internal security processes that perform the data analysis functions of the engine 420. In other examples, the law enforcement entity 430 may also implement a data analysis engine 420.

Referring to FIG. 5, an illustrative reporting table 500 is shown listing a set of communication events identified in a data analysis of organization communication records and/or contact data provided by organization data sources or law enforcement. A data analysis need not be based only any specific contact data (e.g., name, phone number, email address), but might be based entirely on communication records provided by the multiple data sources of organization. Thus, the report 500 may be based entirely on policies and patterns for identifying potentially suspect behavior within the communications records of the organization. However, in other examples, specific contact data (e.g., suspect names, telephone numbers, email addresses, etc.) may be used in the data analysis to help identify other communication records and contacts associated with the contact data.

In this example, a rule has been implemented that flags and reports instances when an employee repeatedly receives a call from an unidentified phone number, and then sends an email message and/or IM to the same person or people shortly after receiving each phone call. Thus, record 510 has been flagged and reported, identifying the employee and related parties, along with other characteristics of this communication event.

Another rule is this example reports multiple occurrences of short phone calls repeatedly received from an external number that does not match any of the family or personal contact information of the employee. Thus, record 520 identifies such an occurrence of received external calls, and provides additional characteristics of this communication event. Another rule in this example reports all instances of 4-deep IM communication chains within the organization records. Thus, the data analysis engine 420 has identified and reported a record 530 in which an employee of the organization sent an internal IM that was forwarded in rapid succession to four other employees.

The final rule illustrated in this example is based on a piece of contact data, in this example, an international phone number provided by a law enforcement entity 430 which has been identified as part of an existing fraud ring targeting the organization 410. The contact data rule reports all phone calls coming into or out of the organization infrastructure to or from the identified international number. Thus, record 540 has been added to report 500, providing additional information to the organization 410 or law enforcement 430 for further investigation.

Referring to FIG. 6, another illustrative reporting table 600 is shown listing a summary of communication activities for an employee of the organization. As discussed above, the employee in this example may have been provided to the data analysis engine 420 by internal or external investigation services, or identified from a previous data analysis. In this example, the data fields 610 contain phone numbers and call information for the most called and received phone calls. Data field 620 corresponds to a most emailed address and data field 630 corresponds to a user identifier of the most sent IMs by the employee.

Additionally, a communication summary 600 may include a keyword summary such as the one shown in data fields 640, in which instances of keyword strings or phrases in phone conversations (retrieved using voice recognition tools), emails, IMs, or other communications to or from the employee are identified and reported. In this example, the keywords 'takeover' and 'bypass' might be associated with a type of fraud or illegal activity that an employee in this organization and job description may potentially be involved in. The 'Gillespie' keyword might correspond to the name of a known criminal operating a fraud ring that targets the organization. The communication summary report 600 may also cross-reference separate tables in the report containing trends and patterns in data fields 650 and 660, respectively, to indicate any instances when the employee was identified in an execution of a data analysis trend or pattern in the analyzed communication records.

Additionally, although FIGS. 5 and 6 only demonstrate two types of data analysis reports for organization communication data, it should be understood that multiple different data reporting formats may be provided. For example, a data analysis engine 420 may be configured to output a complete communication report for an employee. That is, every phone call, email, or IM, etc., involving the employee would be reported in the communication report. As another example, a report might only include behavior that involves the identified employee and matches certain "suspicious" patterns of communication activities stored in the logic module 260. Additionally, communication reports or summaries such as those shown in FIGS. 5 and 6 may be customized by adding and removing columns to update the displayed characteristics, and by refining a report to include a range of times and priorities for communication events.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the true spirit and scope of the present invention. The description is thus to be regarded as illustrative instead of restrictive on the present invention.

The invention claimed is:

1. A method of collecting and analyzing organization data, the method comprising:
   receiving, at a data analysis computing device, communication records from multiple data sources, the multiple data sources corresponding to different channels of communication and comprising two or more of a telephone activity data source, an email activity data source, and an instant messaging activity data source;
   identifying a first contact data associated with a first person in an organization, the first contact data comprising at least one of a name, telephone number, email address, and instant messaging user identifier;
   performing, at the data analysis computing device, an analysis of the received communication records using an automated correlation tool, wherein the analysis comprises performing one or more of a trend analysis, a time analysis, and a pattern analysis on the communication records of the first person for the different channels of communication; and
   identifying, based on the analysis, a first sequence of communication records associated with the first person, the identifying including identifying two communication records associated with the first person, the two communication records occurring within a predetermined time window on the same day, and having different channels of communication, the first sequence of communication records satisfying a predetermined rule used to identify sequences of communication that have a greater potential of being connected to fraudulent or illegal activities within the organization.

2. The method of claim 1, further comprising outputting a visual analysis comprising one or more charts of communication data corresponding to one or more people associated with the first person.

3. The method of claim 1, wherein the first person is an employee of a business, and wherein the analyzing comprises receiving an additional data source corresponding to one of an internal corporate directory of the business and a human resources database of the business.

4. The method of claim 1, wherein the analysis comprises a 3-deep or greater pattern analysis.

5. The method of claim 1, wherein the analysis comprises a key word search of the communication records associated with the first person.

6. The method of claim 1, wherein performing the analysis comprises identifying a repeating sequence of communication records, wherein a first repeating record in the sequence is associated with a first channel of communication and a second repeating record in the sequence is associated with a second channel of communication.

7. The method of claim 1, wherein identifying the first sequence of communication records comprises identifying a first communication record corresponding to a telephone call having a duration less than a predetermined length, and a second communication record corresponding to a non-telephone call occurring proximate in time to the telephone call.

8. The method of claim 1, wherein identifying the first sequence of communication records comprises identifying a first communication record corresponding to an email or an instant message having a length less than a predetermined length.

9. A computing device configured to collect and analyze organization data, the computing device comprising:
- a processor controlling at least some operations of the computing device; and
- a memory storing computer executable instructions that, when executed by the processor, cause the device to perform a method comprising:
  - receiving communication records from multiple data sources, the multiple data sources corresponding to different channels of communication and comprising two or more of a telephone activity data source, an email activity data source, and an instant messaging activity data source;
  - identifying a first contact data associated with a first person in an organization, the first contact data comprising at least one of a name, telephone number, email address, and instant messaging user identifier;
  - performing an analysis of the received communication records using an automated correlation tool, wherein the analysis comprises performing one or more of a trend analysis, a time analysis, and a pattern analysis on the communication records of the first person for the different channels of communication; and
  - identifying, based on the analysis, a first sequence of communication records associated with the first person, the identifying including identifying two communication records associated with the first person, the two communication records occurring within a predetermined time window on the same day, and having different channels of communication, the first sequence of communication records satisfying a predetermined rule used to identify sequences of communication that have a greater potential of being connected to fraudulent or illegal activities within the organization.

10. The computing device of claim 9, wherein the method further comprises outputting a visual analysis comprising one or more charts of communication data corresponding to one or more people associated with the first person.

11. The computing device of claim 9, wherein the first person is an employee of a business, and wherein the analyzing comprises receiving an additional data source corresponding to one of an internal corporate directory of the business and a human resources database of the business.

12. The computing device of claim 9, wherein performing the analysis comprises identifying a repeating sequence of communication records, wherein a first repeating record in the sequence is associated with a first channel of communication and a second repeating record in the sequence is associated with a second channel of communication.

13. The computing device of claim 9, wherein identifying the first sequence of communication records comprises identifying a first communication record corresponding to a telephone call having a duration less than a predetermined length, and a second communication record corresponding to a non-telephone call occurring proximate in time to the telephone call.

14. One or more non-transitory computer-readable media storing computer-executable instructions which, when executed on a computer system, perform a method of collecting and analyzing organization data, the method comprising:
- receiving communication records from multiple data sources, the multiple data sources corresponding to different channels of communication and comprising two or more of a telephone activity data source, an email activity data source, and an instant messaging activity data source;
- identifying a first contact data associated with a first person in an organization, the first contact data comprising at least one of a name, telephone number, email address, and instant messaging user identifier;
- performing an analysis of the received communication records using an automated correlation tool, wherein the analysis comprises performing one or more of a trend analysis, a time analysis, and a pattern analysis on the communication records of the first person for the different channels of communication; and
- identifying, based on the analysis, a first sequence of communication records associated with the first person, the identifying including identifying two communication records associated with the first person, the two communication records occurring within a predetermined time window on the same day, and having different channels of communication, the first sequence of communication records satisfying a predetermined rule used to identify sequences of communication that have a greater potential of being connected to fraudulent or illegal activities within the organization.

15. The non-transitory computer-readable media of claim 14, wherein the analyzing comprises receiving an additional data source corresponding to one of an internal corporate directory of the organization, an employee database of the organization, or a human resources database of the organization.

16. The non-transitory computer-readable media of claim 14, wherein identifying the first sequence of communication records comprises identifying a first communication record corresponding to a telephone call having a duration less than a predetermined length, and a second communication record corresponding to a non-telephone call occurring proximate in time to the telephone call.

17. A method of collecting and analyzing organization data, the method comprising:
- receiving, at a data analysis computing device, communication records from multiple data sources, the multiple data sources corresponding to different channels of communication and comprising two or more of a telephone activity data source, an email activity data source, and an instant messaging activity data source;
- identifying a first contact data associated with a first person in an organization, the first contact data comprising at least one of a name, telephone number, email address, and instant messaging user identifier;
- performing, at the data analysis computing device, an analysis of the received communication records using an automated correlation tool, wherein the analysis comprises performing one or more of a trend analysis, a time analysis, and a pattern analysis on the communication records of the first person for the different channels of communication;

identifying, based on the analysis, a plurality of communication records having a same source, a same recipient, and occurring within a predetermined time window on different days; and identifying, based on the analysis and the plurality of communication records, a first sequence of the plurality of communication records associated with the first person, the first sequence of communication records satisfying a predetermined rule used to identify sequences of communication that have a greater potential of being connected to fraudulent or illegal activities within the organization.

* * * * *